United States Patent [19]
Hopkins et al.

[11] Patent Number: 4,563,266
[45] Date of Patent: Jan. 7, 1986

[54] CATALYTIC DEWAXING PROCESS

[75] Inventors: P. Donald Hopkins, St. Charles; Thomas D. Nevitt; Eugene E. Unmuth, both of Naperville, all of Ill.

[73] Assignee: Standard Oil Company (Indiana), Chicago, Ill.

[21] Appl. No.: 686,077

[22] Filed: Dec. 24, 1984

[51] Int. Cl.$^4$ ............................................. C10G 45/62
[52] U.S. Cl. ..................................... 208/110; 208/111
[58] Field of Search ............................... 208/110, 111

[56] References Cited

U.S. PATENT DOCUMENTS

| | | | |
|---|---|---|---|
| 3,328,119 | 6/1967 | Robson | 208/120 |
| 3,989,617 | 11/1976 | Yan | 208/87 |
| 4,285,919 | 8/1981 | Klotz et al. | 423/277 |
| 4,313,817 | 2/1982 | Mayer et al. | 208/89 |
| 4,327,236 | 4/1982 | Klotz | 208/111 |
| 4,434,047 | 2/1984 | Hensley, Jr. et al. | 208/111 |

Primary Examiner—John Doll
Assistant Examiner—O. Chaudhuri
Attorney, Agent, or Firm—Ekkehard Schoettle; William T. McClain; William H. Magidson

[57] ABSTRACT

The present invention provides for an improved process for catalytically dewaxing and thereby reducing the pour point of a hydrocarbon feedstock by contacting the feedstock and hydrogen with a catalyst. Specifically, the catalytic dewaxing process involves contacting the hydrocarbon feed with hydrogen under catalytic dewaxing conditions in the presence of a catalytic composition comprising a crystalline borosilicate molecular sieve and at least one Group VIII noble metal hydrogenation component.

19 Claims, No Drawings

CATALYTIC DEWAXING PROCESS

BACKGROUND OF THE INVENTION

This invention relates to catalytic dewaxing hydrocarbon feed materials. More particularly, this invention relates to a single-step catalytic dewaxing process for production of lube oil base stocks from a wide range of feeds including relatively low quality, contaminant-containing, waxy hydrocarbon feeds, fuel oils, waxy lube oil distillates, waxy lube oil solvent raffinates, lube oil distillates, and raffinates which have previously been partially dewaxed by solvent dewaxing.

Catalytic dewaxing of petroleum and synthetic crude oil fractions in the presence of shape-selective catalysts capable of selectively cracking n-paraffins and isoparaffins is well-known. For example, U.S. Pat. No. Re. 28,398 (Chen et al.), which is a reissue of U.S. Pat. No. 3,700,585, discloses the use of shape-selective crystalline aluminosilicate zeolite ZSM-5 in catalytic dewaxing processes directed at removing high freezing point paraffins from jet fuel to lower the freezing point, improving the octane rating of naphtha fractions and lowering the pour point of lube oil base stocks. According to Chen et al., the shape selective cracking ability of crystalline aluminosilicate ZSM-5 permits selective cracking of n-paraffins and certain isoparaffins without substantial cracking of desirable feed components such that improved catalytic dewaxing products are obtained under both hydrotreating and hydrocracking conditions. Chen et al. also disclose the use of crystalline aluminosilicate zeolite ZSM-5 associated with hydrogenating metals such as tungsten, vanadium, molybdenum, rhenium, nickel, cobalt, chromium, manganese, platinum or palladium, such metals being associated with the zeolite by exchange or impregnation.

U.S. Pat. No. Re. 30,529, which is a reissue of U.S. Pat. No. 4,100,056, discloses catalytic dewaxing of atmospheric and vacuum distillates in the presence of a catalyst containing mordenite in hydrogen form and a Group VI or VIII metal to obtain naphthenic lube oils of intermediate viscosity index and pour points ranging from −50° to +20° F.

U.S. Pat. No. 4,222,855 (Pelrine et al.) discloses catalytic dewaxing of 450°–1,050° F. hydrocarbon fractions to produce high viscosity index lube oils employing a catalyst containing crystalline aluminosilicate zeolite ZSM-23 or ZSM-35, preferably in hydrogen form and associated with platinum, palladium or zinc. According to the abstract, the use of catalysts containing crystalline aluminosilicate zeolite ZSM-23 or ZSM-35 gives products of higher viscosity index and lower pour point than products obtained through the use of crystalline aluminosilicate zeolite ZSM-5.

U.S. Pat. No. 4,247,388 (Banta et al.) is directed to improving crystalline aluminosilicate zeolites such as ZSM-5 in terms of dewaxing performance by treatment to adjust alpha activity. According to the patentee, alpha activity is adjusted by partial replacement of cationic sites of the crystalline aluminosilicate zeolite with basic cations such as sodium, by partial coking of the zeolite, by employing the zeolite in combination with an inert matrix material, by manipulating the silica-to-alumina ratio of the zeolite or, preferably, by steaming. Crystalline aluminosilicate zeolites adjusted in terms of alpha activity can be employed in association with exchanged or impregnated hydrogenating metals such as tungsten, vanadium, molybdenum, rhenium, nickel, cobalt, chromium, manganese, platinum or palladium. A disclosure similar to that of Banta et al. is found in an abstract of British Pat. No. 2,027,742.

U.S. Pat. No. 4,251,348 and U.S. Pat. No. 4,282,085 (both O'Rear) are directed to processes similar to those described hereinabove wherein a low nitrogen content petroleum distillate fraction boiling from 180°–1,200° F. is contacted with crystalline aluminosilicate zeolite ZSM-5 or a similar crystalline aluminosilicate zeolite in a form substantially lacking in hydrogenation activity to form an effluent which then is fractionated into an upgraded product stream and a $C_3$–$C_4$ olefin fraction. If desired, the crystalline aluminosilicate zeolite can be dispersed in a porous matrix having only insubstantial cracking activity. Suitable matrix materials include pumice, firebrick, diatomaceous earth, alumina, silica, zirconia, titania, amorphous silica-alumina mixtures, bentonite, kaolin, silica-magnesia, silica-zirconia or silica-titania. A similar disclosure is found in an abstract of Belgium Pat. No. 877,772.

U.S. Pat. No. 4,259,174 (Chen et al.) discloses catalytic dewaxing of hydrocarbon feeds to reduce pour point and produce high viscosity index distillate lube oil stocks in the presence of a synthetic offretite crystalline aluminosilicate zeolite catalyst which may contain exchanged or impregnated hydrogenating metals such as tungsten, vanadium, molybdenum, rhenium, nickel, cobalt, chromium, manganese, platinum or palladium. The crystalline aluminosilicate zeolite may be dispersed within a matrix of alumina, silica, silica-alumina, etc. (Column 5, line 67-Column 6, line 17). It is unclear whether the patentee contemplates use of the crystalline aluminosilicate zeolite in association with both hydrogenating metals and matrix materials.

An abstract of British Pat. No. 2,055,120 (Mobil) discloses a method for reclaiming or upgrading contaminated, dewaxed lube oil base stocks having a tendency to form a waxy haze during storage, comprising contacting the oil with hydrogen at 500°–675° F. and a space velocity of 2–10 in the presence of a crystalline aluminosilicate zeolite having a silica-to-alumina ratio of at least 12 and a constraint index of 1–12.

Another catalytic dewaxing process is disclosed in U.S. Pat. No. 4,360,419 (Miller). In particular, a hydrocarbonaceous feed containing normal and slightly-branched chain hydrocarbons is contacted with a catalyst which comprises a hydrogenation component and a zeolite having a mole ratio of an oxide selected from silicon oxide, germanium oxide, and mixtures thereof to an oxide selected from aluminum oxide, gallium oxide, and mixtures thereof greater than about 5:1 and having X-ray diffraction lines as shown in the '419 specification.

U.S. Pat. No. 4,343,692 (Winquist) discloses a process for catalytically hyrodewaxing distillates or residual fractions by contacting the same with hydrogen and a catalyst comprising a synthetic ferrierite zeolite having incorporated therewith at least one metal selected from the group consisting of Group VIB, Group VIIB and Group VIII.

U.S. Pat. No. 4,388,177 (Bowes et al.) discloses a process for selectively hydrocracking straight chain and single-methyl branched hydrocarbons contained in a reformate or waxy hydrocarbon oil feed by contacting the feed with hydrogen and a catalyst composition comprising a natural ferrierite and at least one hydrogenation component selected from the metals of Group VIA and Group VIII. The natural ferrierite is pretreated by contacting it with an oxalate ion under conditions effective to impart to the ferrierite a constraint index from about 1 to 12.

Yet another dewaxing process is disclosed in U.S. Pat. No. 4,390,414 (Cody) which process involves contacting a waxy hydrocarbon oil stock in the presence of hydrogen with a zeolite which has been chemically modified by reaction, under dry, anhydrous conditions, with an organosilane wherein the zeolite has some sites capable of reacting with the organosilane and wherein said organosilane is: (a) capable of entering into the channels of the zeolite and chemically reacting with the reactive sites present therein, as well as (b) capable of reacting with hydroxyl groups present on the external surface of said zeolite, and which zeolite has been loaded with a catalytically active hydrogenating metal component, the contacting being conducted under conditions of pressure, temperature and liquid flow velocity sufficient to effect the hydrodewaxing. The zeolite contemplated for use in the Cody reference is any natural or synthetic unfaulted aluminosilicate material.

Another relevant disclosure is found in U.S. Pat. No. 4,176,050 (Chen et al.) directed to a dewaxing process using macrocrystalline ZSM-5 preferably associated with a hydrogenation metal such as platinum, palladium, zinc, or nickel.

U.S. Pat. No. 4,153,540 (Gorring et al.) teaches a process for upgrading shale oil with a dewaxing catalyst comprising a metal such as nickel or palladium together with a crystalline zeolite having a silica to alumina ratio greater than 12 and a constraint index of 1 to 12, such as ZSM-5.

Along the same vein, U.S. Pat. No. 3,968,024 (Gorring et al.) discloses a dewaxing process using a catalyst comprising crystalline aluminosilicate zeolite such as ZSM-5 together with a metal selected from the group consisting of zinc, cadmium, palladium, and nickel.

As can be gleaned from the above, the art is replete with various catalytic dewaxing processes wherein the catalyst employed typically contains an aluminosilicate.

A further relevant disclosure is found in U.S. Pat. No. 4,431,518 (Angevine et al.) wherein a process for the reduction of the pour point of an oil feedstock is disclosed utilizing a catalyst comprising a boron-containing material having an X-ray diffraction pattern substantially as set out in the subject patent. The X-ray diffraction pattern shown in the subject patent is that of a conventional aluminosilicate zeolite ZSM-5. The patentee points out that a borosilicate-containing dewaxing catalyst is superior to the conventional aluminosilicate containing dewaxing catalysts discussed above because the borosilicate-containing dewaxing catalyst is substantially more nitrogen resistant and thus can be used to dewax feedstocks containing high concentrations of nitrogen compounds. The subject patent is silent with respect to the efficacy afforded by a catalyst containing a Group VIII noble metal and a borosilicate material in connection with a dewaxing process. The subject patent further broadly teaches the cation-exchange of the original alkali metal of the boron-containing zeolite ZSM-5 with cations selected from the group consisting of metal ions, ammonium ions, and hydrogen ions, where metal ions include those selected from the group consisting of metals of Groups II and VIII of the periodic table, rare earth metals, calcium and manganese.

In preparation of lube oils from hydrocarbon feeds, catalytic dewaxing processes such as described hereinabove often are combined with hydrotreating, hydrocracking and/or various solvent extraction steps to obtain products having desired properties. Typically, hydrocracking and/or solvent extraction steps are conducted prior to catalytic dewaxing to remove components such as metal-containing feed components, asphaltenes and polycyclic aromatics having properties that differ grossly from those desired. In particular, solvent extraction is conducted to remove polycyclic aromatic feed components and nitrogen-containing cyclic components, removal of the latter being particularly important in order to avoid poisoning of the catalyst in catalytic dewaxing. Hydrotreating under mild or severe conditions typically follows catalytic dewaxing operations and serves to improve such lube oil properties as stability and viscosity index.

One example of a process for producing lube oils in which a catalytic dewaxing step is included as part of a multistep process, namely U.S. Pat. No. 4,259,170 (Graham et al.), discloses a process that includes a combination of catalytic dewaxing and solvent dewaxing steps. According to a more specific aspect of Graham et al., the process includes a solvent extraction step prior to the dewaxing steps. As a further example of a multistep process for preparation of lube oils, Chen et al. '714, discussed hereinabove, discloses a process comprising solvent extraction followed by catalytic dewaxing.

U.S. Pat. No. 4,283,272 (Garwood et al.) discloses preparation of lube oils by a process that includes hydrocracking, catalytic dewaxing and hydrotreating steps.

U.S. Pat. No. 4,292,166 (Gorring et al.) discloses a combination process wherein a dewaxing step is carried out prior to a hydrocracking step. Specifically, a hydrocarbon oil feed selected from the group consisting of vacuum gas oils, deasphalted oils and mixtures thereof is converted to a low pour point, high VI lube base stock by first dewaxing the feed in the presence of hydrogen and a dewaxing catalyst comprising a zeolite having a constraint index of 1 to 12, followed by contacting the dewaxed feedstock and hydrogen with a hydroconversion catalyst comprising a platinum group metal and a zeolite having a silica-to-alumina ratio of at least 6.

Finally, a combination process is disclosed in European Patent Application No. 82300226.6 (Smith et al.) wherein a hydrocarbon oil containing impurities deleterious to the catalyst is first treated with a sorbent comprising a first molecular sieve zeolite having pores with an effective diameter of at least about 5 Angstroms under sorption conditions, followed by a treatment with a dewaxing catalyst comprising a second molecular sieve zeolite having pores with an effective diameter of at least about 5 Angstroms, the effective diameter of which is equal to or smaller than the effective diameter of the pores of the first molecular sieve zeolite. In a more specific aspect of the disclosure, the first and second molecular sieves have the same crystal structure wherein the constraint index is 1 to 12 and the dried hydrogen-form crystal density is less than about 1.6 grams per cubic centimeter.

Despite the plethora of catalytic dewaxing processes disclosed in the art there is still a need for an improved catalytic dewaxing process. More specifically, there is a need for a catalytic dewaxing process wherein the dewaxing catalyst is nitrogen-resistant and produces a lube base product possessing an improved VI coupled with greater lube base stock yields.

Accordingly, it is an object of the present invention to provide a process for dewaxing feedstocks which contain nitrogen compounds which process produces lube base stocks in higher yields possessing greater VIs.

It has now been discovered that a particular molecular sieve-containing catalyst produces improved results in connection with a hydrocarbon dewaxing process. In particular, a dewaxing process employing a catalyst comprising a crystalline borosilicate and a Group VIII noble metal component results in high lube yields with concomitantly less light gas make. Further, the process of the present invention provides a lube oil base stock possessing a high viscosity index and a reduced sulfur content. The combination of above benefits is achieved when the dewaxing process is carried out in accordance with the present invention.

In connection with the present invention it should be noted that hydrogen processing catalysts containing an AMS-type borosilicate molecular sieve coupled with catalytic metal components are known. For instance, commonly assigned U.S. Pat. No. 4,434,047 (Hensley, Jr. et al.) discloses a catalytic dewaxing hydrotreating process using a catalyst containing a shape-selective zeolitic cracking component such as an AMS-type borosilicate molecular sieve, and a hydrogenating component containing Cr, at least one other Group VIB metal and at least one Group VIII metal. U.S. Pat. No. 4,268,420 similarly discloses an AMS-type crystalline borosilicate which can be used in intimate combination with a hydrogenating component, such as tungsten, vanadium, molybdenum, rhenium, nickel, cobalt, chromium, manganese, or a noble metal, such as platinum or palladium, or rare earth metals, where a hydrogenation-dehydrogenation function is to be performed.

Further, co-pending commonly assigned U.S. Ser. No. 200,536 discloses catalytic compositions comprising chromium, molybdenum, at least one Group VIII metal, a crystalline molecular sieve, and a refractory inorganic oxide, suitable for use in a process for hydrogenation and hydrocracking of high-nitrogen content feeds. The subject application also discloses the use of a crystalline borosilicate in connection with the above-described catalytic composition.

SUMMARY OF THE INVENTION

The present invention involves an improved process for catalytically dewaxing and thereby reducing the pour point of a hydrocarbon feedstock by contacting the feedstock and hydrogen with a catalyst. Specifically, the catalytic dewaxing process of the present invention involves contacting the hydrocarbon feed with hydrogen under catalytic dewaxing conditions in the presence of a catalytic composition comprising a crystalline borosilicate molecular sieve and at least one Group VIII noble metal hydrogenation component.

DETAILED DESCRIPTION OF THE INVENTION

Briefly, the catalytic dewaxing process of the present invention comprises contacting a hydrocarbon feed with hydrogen under catalytic dewaxing conditions in the presence of a catalyst comprising a crystalline borosilicate molecular sieve and a hydrogenation component selected from the group consisting of Group VIII noble metals. According to a more specific aspect of the invention, there is provided an improved process for preparation of lube oils of low pour point and high viscosity index consisting essentially of catalytically dewaxing a petroleum or synthetic crude oil fraction which may contain appreciable quantities of aromatics and impurities such as sulfur or nitrogen, in the presence of the aforesaid catalyst.

In greater detail, the hydrocarbon feed materials employed according to the present invention are whole petroleum or synthetic crude oils, coal or biomass liquids, or fractions thereof. Narrower fractions include fuel oils, waxy lube oil distillates, waxy lube oil solvent raffinates and lube oil distillates or raffinates which have been previously partially dewaxed by solvent dewaxing, e.g., toluene-methyl ethyl ketone propane dewaxing. The catalytic dewaxing process of the present invention gives particularly good results with respect to feeds containing sufficiently high levels of waxy components as to exhibit pour points of at least about 30° F. Preferred feed materials for preparation of lube oil base stocks by the single step process of this invention are distillate fractions boiling above about 500° F. and having pour points of about 50° to about 130° F. Both vacuum and atmospheric distillate fractions are contemplated according to the invention as are deasphalted resids or other fractions that have been hydrotreated or hydrocracked to reduce boiling point and/or remove impurities such as sulfur, nitrogen, oxygen or metals. While such feeds are contemplated, it should be understood that the feed materials employed according to the present invention can contain appreciable levels of impurities such as sulfur, nitrogen and/or oxygen. For example, up to about 2 wt% sulfur, 1.5 wt% oxygen and/or about 0.5 wt% nitrogen can be present in the feed without adversely affecting the dewaxing process.

Catalytic dewaxing conditions employed according to the present invention vary somewhat depending upon the choice of feed material. In general, however, the temperature ranges from about 500° to about 900° F., the total pressure ranges from about 100 to 3,000 psig, hydrogen partial pressure ranges from about 50 to about 2,500 psig, linear hourly space velocity (LHSV) ranges from about 0.1 to about 20 volumes of feed per volume of catalyst per hour (reciprocal hours) and hydrogen addition rate ranges from about 500 to about 20,000 standard cubic feed per barrel (SCFB).

Contacting the hydrocarbon feed with hydrogen under the aforesaid conditions can be conducted using either a fixed or expanded bed of catalyst and in a single reactor or a series of reactors, as desired.

The catalyst employed according to the present invention comprises a crystalline borosilicate molecular sieve and at least one Group VIII noble metal hydrogenation component.

Crystalline borosilicate molecular sieves of the AMS type are preferred and have the following composition in terms of mole ratios of oxides:

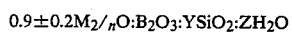

$$0.9 \pm 0.2 M_2/_nO:B_2O_3:YSiO_2:ZH_2O$$

wherein M is at least one cation having a valence of n, Y ranges from about 4 to about 600 and Z ranges from 0 to about 160, and provide an x-ray diffraction pattern comprising the following x-ray diffraction lines and assigned strengths:

| d (Å) | Assigned Strength |
|---|---|
| 11.2 ± 0.2 | W-VS |
| 10.0 ± 0.2 | W-MS |

| d (Å) | Assigned Strength |
|---|---|
| 5.97 ± 0.07 | W–M |
| 3.82 ± 0.05 | VS |
| 3.70 ± 0.05 | MS |
| 3.62 ± 0.05 | M–MS |
| 2.97 ± 0.02 | W–M |
| 1.99 ± 0.02 | VM–M |

Such crystalline borosilicates typically are prepared by reaction of boron oxide and a silicon-containing material in a basic medium such as a metal or ammonium hydroxide. Further details with respect to these shape selective crystalline borosilicate molecular sieve cracking components are found in commonly assigned U.S. Pat. No. 4,269,813 (Klotz) which is incorporated herein by reference wherein the AMS-1B crystalline borosilicate molecular sieve is disclosed.

AMS-1B crystalline borosolicate molecular sieves can also be prepared by crystallizing a mixture of an oxide of silicon, an oxide of boron, an alkylammonium compound and ethylenediamine. This method is carried out in a manner such that the initial reactant molar ratios of water to silica range from about 5 to about 25, preferably about 10 to about 22, and most preferably about 10 to about 15. In addition, preferable molar ratios for initial reactant silica to oxide of boron range from about 4 to about 150, more preferably about 5 to about 80, and most preferably about 5 to about 20. The molar ratio of ethylenediamine to silicon oxide used in the preparation of AMS-1B crystalline borosilicate should be above about 0.05, typically below about 5, preferably about 0.1 to about 1.0, and most preferably about 0.2 to about 0.5. The molar ratio of alkylammonium template compound or precursor to silicon oxide useful in the preparation of this invention can range from 0 to about 1 or above, typically above about 0.001, preferably about 0.005 to about 0.1, and most preferably from about 0.005 to about 0.02. The silica source is preferably a low sodium content silica source containing less than 2000 ppmw Na and most preferably less than 1000 ppmw Na, such as Ludox AS-40 which contains 40 wt% SiO$_2$ and 0.08 wt% Na$_2$O or Nalco 2327 which has similar specifications.

It is noted that the preferable amount of alkylammonium template compound used in the instant preparation method is substantially less than that required to produce AMS-1B conventionally using an alkali metal cation base. The borosilicate prepared by the instant method typically contains at least 9000 ppmw boron and less than about 100 ppmw sodium and is designated as HAMS-1B-3. The HAMS-1B-3 crystalline borosillicate has a higher boron content and lower sodium content than crystalline borosilicates formed using coventional techniques.

Although not required, it is preferred to employ the above-described borosilicate molecular sieve component dispersed in a matrix of at least one non-molecular sieve, porous refractory inorganic oxide matrix component as the use of such a matrix component facilitates provision of the ultimate catalyst in a shape or form well suited for process use. Useful matrix components include alumina, silica, silica-alumina, zirconia, titania, etc., and various combinations thereof. The matrix component also can contain various adjuvants such as phosphorus oxides, boron oxides and/or halogens such as fluorine or chlorine. Usefully, the molecular sieve matrix dispersion contains about 5 to about 70 wt% molecular sieve component and about 30 to about 95 wt% matrix component.

Methods for dispersing molecular sieve materials within a matrix component are well-known to persons skilled in the art and applicable with respect to the borosilicate molecular sieve materials employed according to the present invention. A preferred method is to blend the shape-selective molecular sieve component, preferably in a finely-divided form, into a sol, hydrosol or hydrogel of an inorganic oxide, and then add a gelling medium such as ammonium hydroxide to the blend with stirring to produce a gel. The resulting gel can be dried, dimensionally formed if desired, and calcined. Drying preferably is conducted in air at a temperature of about 80° to about 350° F. (about 27 to about 177° C.) for a period of several seconds to several hours. Calcination preferably is conducted by heating in air at about 800° to about 1,200° F. (about 427° to about 649° C.) for a period of time ranging from about ½ to about 16 hours.

Another suitable method for preparing a dispersion of shape-selective molecular sieve component in a porous refractory oxide matrix component is to dry blend particles of each, preferably in finely-divided form, and then to dimensionally form the dispersion if desired.

The hydrogenation component of the catalyst employed according to the present invention can be present in elemental form, as oxides or sulfides, or as combinations thereof. The hydrogenation component is at least one Group VIII noble metal, the subject group consisting of platinum and palladium. Group VIII noble metals afford superior results in the invention process with regard to higher lube oil yields and attendant VIs when compared to other Group VIII metals such as, for instance, nickel.

Relative proportions to the borosilicate molecular sieve component and the hydrogenation component of the catalysts are such that at least a catalytically-effective amount of each is present. Preferably, catalysts employed according to the invention contain about 10 to about 70 wt% of the borosilicate molecular sieve component and about 0.01 to about 10 wt% of the hydrogenation component based on total catalyst weight. More preferably, borosilicate molecular sieve component concentration ranges from about 20 to about 60 wt% in order to attain a desirable degree of selective dewaxing activity while avoiding inclusion in the catalyst of amounts of borosilicate component that unduly increase the cost of the ultimate catalyst. When the borosilicate component is employed as a dispersion in a matrix component, preferred matrix component ranges from about 20 to about 70 wt% based on total catalyst weight.

The hydrogenation component content preferably ranges from about 0.01 to about 10 wt%, calculated as a zero valent metal and being based on the total weight of the catalytic composite, with about 0.01 to about 5 wt% being more preferred, with a range of 0.4 to 1.0 wt% being most preferred. Higher levels of metals can be employed if desired, though the degree of improvement resulting therefrom typically is insufficient to justify the added cost of the metals.

The hydrogenation component of the catalyst employed according to this invention can be associated with the borosilicate molecular sieve component by impregnation of the borosilicate component, or the borosilicate component can be dispersed in a porous refractory inorganic oxide matrix, with one or more solutions of compounds of the hydrogenation component which compounds are convertible to oxides on calcination. It also is contemplated, however, to impregnate a porous refractory inorganic oxide matrix component with such solutions of the hydrogenation component and then blend the borosilicate component with the resulting impregnation product. Accordingly, the present invention contemplates the use of catalysts in which the hydrogenation component is deposed on the borosilicate component, on a borosilicate matrix component dispersion or on the matrix component of a borosilicate matrix dispersion.

The mechanics of impregnating the borosilicate component, matrix component or borosilicate matrix composite with solutions of compounds convertible to metal oxides on calcination are well-known to persons skilled in the art and generally involve forming solutions of appropriate compounds in suitable solvents, preferably water, and then contacting the borosilicate matrix component or borosilicate matrix dispersion with an amount or amounts of solution or solutions sufficient to deposit appropriate amounts of metal or metal salts onto the borosilicate or borosilicate matrix dispersion. Useful metal compounds convertible to oxides are well-known to persons skilled in the art and include various ammonium salts as well as metal acetates, nitrates, anhydrides, etc.

The above-described catalysts can be employed in any suitable form such as spheres, extrudates, pellets, or C-shaped or cloverleaf-shaped particles.

According to a preferred aspect of the invention, however, there is provided an improved process for preparation of high quality lube oil base stocks of high viscosity index, low pour point and good stability consisting essentially of catalytically dewaxing a petroleum or synthetic crude oil fraction containing up to about 2 wt% sulfur, 1.5 wt% oxygen and/or 0.5 wt% nitrogen in the presence of the aforesaid catalyst. Preferred conditions according to this aspect of the invention include temperatures ranging from about 500° to about 750° F., pressures of about 300 to about 900 psig, LHSVs of about 0.20 to about 5.0 reciprocal hours, hydrogen partial pressures of about 300 to 800 psig, and hydrogen addition rates of about 2,000 to about 5,000 SCFB.

The catalytic dewaxing process described hereinabove can be included as part of a multistep process for the preparation of lube oils wherein catalytic dewaxing is conducted in combination with other conventional processing steps such as solvent extraction, deasphalting, solvent dewaxing, hydrocracking and/or hydrotreating to obtain lube oil base stocks of relatively low pour point and high viscosity index and stability.

In a highly preferred aspect of the present invention, the feedstock to the dewaxing process is solvent-extracted with N-methyl-2-pyrrolidone (NMP) in a conventional manner followed by hydrotreatment in a conventional manner prior to passage to the dewaxing zone in a manner disclosed and claimed in U.S. Ser. No. 686,096 filed on even date and incorporated herein by reference.

We have discovered that while the borosilicate-containing dewaxing catalyst is generally more nitrogen resistant than conventional aluminosilicate-containing dewaxing catalysts, basic nitrogen compounds, such as NMP contained in NMP-extracted raffinates, can result in premature deactivation of the borosilicate catalyst. Hence, in accordance with a highly preferred aspect of the present invention, the effluent from an NMP extraction zone is hydrotreated to reduce the amount of nitrogen, specifically basic nitrogen compounds, contained in the dewaxing zone influent. The sulfur content of the dewaxing zone influent is likewise reduced in the hydrotreating zone, thereby reducing any sulfur poisoning of the hydrogenation component in the dewaxing catalyst. It is believed this results in increased aromatics saturation in the dewaxing zone resulting in an increase in VI of the lube base stock.

Suitable operating conditions in the hydrotreating zone are summarized in Table 1.

TABLE 1

| HYDROTREATING OPERATING CONDITIONS | | |
|---|---|---|
| Conditions | Broad Range | Preferred Range |
| Temperature, °F. | 400–850 | 500–750 |
| Total pressure, psig | 50–4,000 | 400–1500 |
| LHSV | .10–20 | .25–2.5 |
| Hydrogen rate, SCFB | 500–20,000 | 800–6,000 |
| Hydrogen partial pressure, psig | 50–3,500 | 500–1,000 |

The hydrotreater is also preferably operated at conditions that will result in a liquid effluent stream having less than 10 ppmw nitrogen-containing impurities, based on nitrogen, and less than 20 ppmw sulfur-containing impurities, based on sulfur, and most preferably less than 5 ppmw and 10 ppmw, respectively. The above-set out preferred nitrogen and sulfur contents correspond to substantial conversion of the sulfur and nitrogen compounds entering the hydrotreater.

The catalyst employed in the hydrotreater can be any conventional and commercially available hydrotreating catalyst. The subject hydrotreating catalysts typically contain one or more elements from Groups IIB, VIB, and VIII supported on an inorganic refractory support such as alumina. Catalysts containing NiMo, NiMoP, CoMo, CoMoP, and NiW are most prevalent.

Other suitable hydrotreating catalysts for the hydrotreating stage of the present invention comprise a Group VIB metal component or a non-noble metal component of Group VIII and mixtures thereof, such as cobalt, molybdenum, nickel, tungsten and mixtures thereof. Suitable supports include inorganic oxides such as alumina, amorphous silica-alumina, zirconia, magnesia, boria, titania, chronia, beryllia, and mixtures thereof. The support can also contain up to about 20 wt.% zeolite based on total catalyst weight. A preferred hydrotreating catalyst contains sulfides or oxides of Ni and Mo composited with an alumina support wherein the Ni and Mo are present in amounts ranging from 0.1 to 10 wt%, calculated as NiO, and 1 to 20 wt%, calculated as $MoO_3$, based on total catalyst weight.

Prior to the dewaxing in accordance with a preferred aspect of the present invention, the $H_2S$ and $NH_3$ gases are stripped from the hydrotreater effluent in a conventional manner in a gas-liquid separation zone.

The present invention is described in further detail in connection with the following examples, it being understood that the same are for purposes of illustration and not limitation.

EXAMPLE I

A catalyst support containing 60 wt% of the hydrogen form of AMS-1B crystalline borosilicate material was prepared according to the procedure elucidated below.

432 g of AMS-1B borosilicate molecular sieve were comminuted to pass through a 100-mesh screen (U.S. Sieve Series). This borosilicate material, a commercially-prepared material, was also analyzed by an X-ray diffraction analysis technique and was found to be 90% crystalline. The following Table 2 presents the significant interplanar spacings, associated relative intensities (I/Io), and assigned strengths that were found in its X-ray diffraction pattern, which spacings and associated information identify the material as being AMS-1B borosilicate molecular sieve. The specific type of AMS-1B sieve used in the instant example is designated as HAMS-1B-1 which sieve is characterized by a boron content of about 5,000 ppm by weight and a sodium content of 250 ppm by weight.

TABLE 2
CONDENSED X-RAY DIFFRACTION PATTERN FOR AMS-1B BOROSILICATE

| d (Å) | I/Io | Assigned Strength |
|---|---|---|
| 11.16 | 43 | MS |
| 10.0 | 32 | M |
| 5.97 | 12 | W |
| 3.83 | 100 | VS |
| 3.71 | 45 | MS |
| 3.63 | 29 | M |
| 2.97 | 17 | W |
| 1.98 | 18 | W |

The borosilicate molecular sieve material was suspended in distilled water and vigorously mixed with 2796 g of PHF alumina hydrosol manufactured by American Cyanamid from high-purity aluminum. This hydrosol contained approximately 10% $Al_2O_3$ on a dry basis. The blending operation was carried out in a laboratory Waring blender. The sol-sieve slurry was then gelled while blending with 400 ml of (14 wt% as $NH_3$) of concentrated $NH_4OH$ solution and subsequently dried overnight at 250° F. The dried solid was comminuted to pass a 100-mesh screen and subsequently extruded through a ⅛" diameter die with a Bonnot laboratory extruder. The extrudate was then dried overnight at 250° F. and calcined at 1000° F. for three hours in air. The finished extrudate was comminuted to pass through an 8-mesh screen and be retained on a 14-mesh screen.

EXAMPLE II

A catalyst according to the present invention containing 0.5 wt% Pd was prepared using the suppport described in Example I. 6.2 cc of 0.1 g Pd/cc solution of $Pd(NO_3)_2$ were diluted to a volume of 115 cc with distilled water. The impregnating solution was then added to 123.8 g of the borosilicate-containing support component described in Example I. The wet extrudate was dried overnight at 250° C. and calcined for 2 hours in air at 500° C. The present catalyst was designated as catalyst A.

80 cc of the above catalyst were subsequently loaded into an automated processing pilot plant with a downflow, ¾-inch diameter tubular reactor having a length of about 32 inches. The reactor is associated with automatic controls to maintain constant flow rates, temperature and pressure.

After loading the reactor, the catalyst was reduced at 800 psig and 500° F. in flowing hydrogen for 3 hours prior to the introduction of feed. The dewaxing feedstock was fed to the pilot plant reactor using a positive displacement pump. Gas and liquid reactor effluents were separated using a high-pressure separator. The off-gas was analyzed daily by a gas chromatograph. Liquid products were vaccum distilled into the appropriate boiling fractions to determine their respective amounts. The lube oil cut point was set such that the sample met the maximum viscosity specification or the minimum flash point specification. The feedstock was an SAE-10 raffinate which had been phenol-extracted commercially to meet the VI specification of 95 and is designated as "RAF-10."

Further feed properties are set out below:

| | |
|---|---|
| Pour Point (°F.) | 95 |
| API Gravity (°) | 32.2 |
| Carbon (wt %) | 86.10 |
| Sulfur (wt %) | .18 |
| Nitrogen (ppm) | 23 |
| Mass Spec. | |
| Paraffins | 39.2 |
| Cycloparaffins | 48.1 |
| Monoaromatics | 3.6 |
| Diaromatics | 3.5 |
| Triaromatics | 0.9 |
| Other Polycyclic Aromatics | 4.6 |
| Simulated Distillation (°F.) | |
| 10 wt % | 722° F. |
| 50 wt % | 833° F. |
| 90 wt % | 895° F. |

The following Table 3 sets out the specific operating conditions, product yields, and product properties resulting from the pilot plant operation carried out in the present example.

TABLE 3

| Time on stream, hrs | 5 | 118 | 166 | 194 | 219 |
|---|---|---|---|---|---|
| Avg. Cat. Temp., °F. | 601 | 598 | 600 | 601 | 602 |
| LHSV | .78 | .48 | .49 | .51 | .52 |
| $H_2$, SCFB | 3163 | 5474 | 5304 | 5030 | 4715 |
| Pressure, psig | 800 | 800 | 800 | 800 | 400 |
| Feed | RAF-10 | RAF-10 | RAF-10 | RAF-10 | RAF-10 |
| Yields, wt % | | | | | |
| Methane | .00 | .01 | .01 | .01 | .01 |
| Ethane | .00 | .04 | .04 | .04 | .04 |
| Propane | .12 | 3.62 | 3.37 | 3.13 | 2.94 |
| Butane | .18 | 4.50 | 4.15 | 3.78 | 3.55 |
| $C_5^+$ naphtha | 1.49 | 6.18 | 6.01 | 4.27 | 4.18 |
| Distillate | 18.92 | 17.17 | 13.26 | 24.39 | 12.19 |
| Lube Oil | 33.24 | 67.82 | 70.97 | 62.34 | 70.46 |
| Total Liquid | 53.65 | 91.18 | 90.25 | 91.00 | 86.83 |
| Properties of Lube Oil | | | | | |
| Pour pt, °F. | −45 | 0 | 0 | — | 5 |
| Viscosity cSt @ 100° C. | 6.50 | 6.42 | 6.22 | — | 6.28 |
| Viscosity cSt @ 40° C. | 50.10 | 45.99 | 43.97 | — | 44.53 |
| Viscosity index | 71 | 84 | 83 | — | 84 |
| Sulfur, wt % | 84 | 365 | 378 | — | 480 |
| Nitrogen, ppm | — | 2.8 | 2.4 | — | 2.9 |
| Time on stream, hrs | 224 | 338 | 386 | 434 | 458 |
| Avg. Cat. Temp., °F. | 601 | 600 | 602 | 601 | 600 |
| LHSV | .49 | .52 | .49 | .49 | .49 |
| $H_2$, SCFB | 4977 | 4968 | 5135 | 5135 | 5128 |
| Pressure, psig | 800 | 800 | 800 | 800 | 800 |
| Feed | RAF-10 | RAF-10 | RAF-10 | RAF-10 | RAF-10 |
| Yields, wt % | | | | | |
| Methane | .00 | .00 | .00 | .00 | .00 |
| Ethane | .04 | .03 | .04 | .03 | .03 |
| Propane | 2.92 | 2.74 | 2.88 | 2.80 | 2.80 |
| Butane | 4.84 | 3.35 | 3.57 | 3.38 | 3.50 |
| $C_5^+$ naphtha | 3.19 | 6.09 | 4.12 | 4.44 | 5.15 |
| Distillate | 13.97 | 12.07 | 11.46 | 12.70 | 12.62 |
| Lube Oil | 71.87 | 69.56 | 71.10 | 70.86 | 72.87 |
| Total Liquid | 89.03 | 87.73 | 86.68 | 88.00 | 90.65 |
| Properties of Lube Oil | | | | | |

TABLE 3-continued

| | | | | | |
|---|---|---|---|---|---|
| Pour pt, °F. | 5 | 5 | 5 | 5 | — |
| Viscosity cSt @ 100° C. | 6.37 | 6.21 | 6.22 | 6.16 | 6.13 |
| Viscosity cSt @ 40° C. | 44.45 | 43.28 | 43.53 | 42.78 | 42.60 |
| Viscosity index | 89 | 86 | 85 | 86 | 85 |
| Sulfur, wt % | 520 | 550 | 530 | 540 | 540 |
| Nitrogen, ppm | 2.9 | 3.5 | 4.8 | 3.9 | 3.8 |
| Time on stream, hrs | 506 | 626 | 698 | 744 | 794 |
| Avg. Cat. Temp., °F. | 601 | 601 | 600 | 599 | 600 |
| LHSV | .49 | .52 | .49 | .52 | .49 |
| H$_2$, SCFB | 5344 | 4947 | 5154 | 3217 | 5103 |
| Pressure, psig | 800 | 820 | 800 | 800 | 800 |
| Feed | RAF-10 | RAF-10 | RAF-10 | RAF-10 | RAF-10 |
| Yields, wt % | | | | | |
| Methane | .00 | .00 | .00 | .00 | .00 |
| Ethane | .03 | .03 | .03 | .02 | .03 |
| Propane | 2.80 | 2.62 | 2.53 | 1.55 | 2.62 |
| Butane | 3.45 | 3.29 | 3.18 | 1.97 | 3.32 |
| C$_5$+ naphtha | 5.14 | 4.29 | 4.41 | 2.96 | 4.64 |
| Distillate | 14.56 | 10.90 | 11.72 | 10.09 | 11.54 |
| Lube Oil | 80.77 | 76.13 | 74.61 | 75.99 | 75.67 |
| Total Liquid | 100.46 | 91.32 | 90.74 | 89.03 | 91.85 |
| Properties of Lube Oil | | | | | |
| Pour pt, °F. | 10 | 5 | 10 | 20 | 15 |
| Viscosity cSt @ 100° C. | 6.11 | 6.16 | 6.17 | 6.03 | 6.10 |
| Viscosity cSt @ 40° C. | 42.09 | 42.66 | 42.53 | 40.51 | 41.71 |
| Viscosity index | 86 | 86 | 87 | 90 | 88 |
| Sulfur, wt % | 580 | 630 | 670 | 780 | 670 |
| Nitrogen, ppm | 4.3 | 6.2 | 5.7 | 6.1 | 5.3 |
| Time on stream, hrs | 842 | 880 | 938 | 938 | |
| Avg. Cat. Temp., °F. | 602 | 601 | 601 | 602 | |
| LHSV | .49 | .48 | .49 | .48 | |
| H$_2$, SCFB | 5105 | 5221 | 5041 | 5385 | |
| Pressure, psig | 800 | 800 | 800 | 800 | |
| Feed | RAF-10 | RAF-10 | RAF-10 | RAF-10 | |
| Yields, wt % | | | | | |
| Methane | .00 | .00 | .00 | .00 | |
| Ethane | .03 | .03 | .03 | .03 | |
| Propane | 2.73 | 2.89 | 2.59 | 2.5 | |
| Butane | 3.52 | 3.61 | 3.24 | 3.12 | |
| C$_5$+ naphtha | 4.31 | 4.31 | 4.54 | 4.51 | |
| Distillate | 9.24 | 7.66 | 11.11 | 10.17 | |
| Lube Oil | 73.91 | 73.30 | 75.22 | 74.83 | |
| Total Liquid | 87.47 | 85.27 | 90.87 | 89.52 | |
| Properties of Lube Oil | | | | | |
| Pour pt, °F. | 10 | 10 | 5 | 10 | |
| Viscosity cSt @ 100° C. | 6.08 | 6.17 | 6.13 | 6.09 | |
| Viscosity cSt @ 40° C. | 41.58 | 42.62 | 42.27 | 41.7 | |
| Viscosity index | 87 | 87 | 86 | 90 | |
| Sulfur, wt % | 660 | 610 | 700 | 700 | |
| Nitrogen, ppm | 5.3 | 4.2 | 6.7 | 5.6 | |

EXAMPLE III

In the instant comparative example, Ni was impregnated upon the catalyst support component described in Example I containing 60 wt% of the hydrogen form of AMS-1B crystalline borosilicate material.

1 wt% Ni was impregnated on 120 grams of the Example I support component. Specifically, 5.94 g Ni(NO$_3$)$_2$.6H$_2$O were dissolved in enough distilled water to make 111.6 cc of solution. This solution was then added to the support in a rotary impregnator to the point of incipient wetness. The catalyst was dried for 20 minutes at 250° F. and then dried overnight at room temperature. The catalyst was calcined in air at 932° F. for 2 hours. The instant catalyst is designated as catalyst B.

80 cc of this catalyst were loaded into the pilot plant described in Example II and preheated with a hydrogen reduction for 3 hours at 600° F. and 800 psig. The SAE-10 raffinate feed described in Example II was then dewaxed in the presence of the comparative catalyst at about 0.5 LHSV and 5,000 SCFB of hydrogen.

The results of the instant pilot plant trial are set out in Table 4 below:

TABLE 4

| | | | | | |
|---|---|---|---|---|---|
| Time on stream, hrs | 64 | 161 | 232 | 329 | 473 |
| Avg. Cat. Temp., °F. | 600 | 552 | 651 | 601 | 600 |
| LHSV | 0.5 | 0.5 | 0.5 | 0.5 | 0.5 |
| H$_2$, SCFB | 5000 | 5000 | 5000 | 5000 | 5000 |
| Pressure, psig | 800 | 800 | 800 | 800 | 400 |
| Yields, wt % | | | | | |
| I.B.P.-360° F. | 8.9 | 0.0 | 11.4 | 5.1 | 2.4 |
| 360-650° F. | 9.5 | 0.2 | 10.0 | 8.9 | 9.1 |
| Lube Oil | 63.9 | 94.0 | 59.6 | 76.2 | 73.4 |
| Total Liquid | 82.3 | 94.2 | 81.00 | 90.20 | 84.90 |
| Properties of Lube Oil | | | | | |
| Gravity, API | 29.4 | 31.7 | 29.2 | 30.4 | 30.2 |
| Pour pt, °F. | −5 | +85 | −15 | +35 | +15 |
| Viscosity cSt @ 100° C. | 6.33 | 5.22 | 6.07 | 5.84 | 5.99 |
| Viscosity cSt @ 40° C. | 45.17 | 28.45 | 43.13 | 37.79 | 39.24 |
| Viscosity index | 83 | 115 | 79 | 97 | 94 |
| Sulfur, wt % | .109 | .069 | .085 | .043 | .037 |
| Nitrogen, ppm | 4.4 | 11 | 1.4 | 6.6 | 11 |

EXAMPLE IV

In the present example, a support material similar to the one described in Example I was prepared except that the HAMS-1B-2 borosilicate sieve was used to prepare a 60 wt% HAMS-1B-2/40 wt% Al$_2$O$_3$ support material. HAMS-1B-2 is also a crystalline borosilicate material except a different preparation procedure is employed to prepare the subject material. In particular, the HAMS-1B-2 borosilicate sieve contains about 9,000 ppm boron versus about 5,000 ppm boron contained in the HAMS-1B-1 borosilicate but the same amount of sodium; about 250 ppmw Na is contained in both HAMS-1B-1 and HAMS-1B-2. The HAMS-1B-1 borosilicate molecular sieve is prepared by crystallizing an aqueous mixture of an oxide of boron, an oxide of silicon, and an organic template compound in the presence of an alkali metal hydroxide, usually sodium hydroxide. Briefly, the HAMS-1B-2 borosilicate is prepared in the same manner HAMS-1B-3 is prepared, namely, in the absence of an alkali hydroxide or an ammonium hydroxide by reacting under crystallization conditions in an aqueous mixture containing an oxide of silicon, an oxide of boron, an alkylammonium cation or a precursor of an alkylammonium cation such as tetra-N-propylammonium, and ethylenediamine.

HAMS-1-2 was prepared by mixing in the following order ethelenediamine, H$_3$BO$_3$ acid, tetra-n-proylammonium bromide (TPABr) and colloidal silica. The mixture was then digested at 145° C. for four days. The product from the first digestion was then redigested for an additional five days. The product sieve was then thoroughly washed with distilled water, dried at 130° C. for 16 hours and calcined at 535° C. for 12 hours.

The mole ratios of the reactants were as follows: H$_2$O/SiO$_2$=15, B$_2$O$_3$/SiO$_2$=15, ethylene diamine/SiO$_2$=0.30, and TPABr/SiO$_2$=0.023. A catalyst support containing 60 wt% HAMS-1B-2/40 wt% Al$_2$O$_3$ was then prepared in a manner substantially as elucidated in Example I.

After preparation of the 60 wt% HAMS-1B-2/40 wt% Al₂O₃ support component, an impregnation with a Pd(NO₃)₂ solution was carried out substantially as described in Example II to prepare a catalyst in accordance with the present invention. The final calcined catalyst contained 0.5 wt% Pd. The present catalyst was designated as Catalyst C.

The following Table 5 sets out the results of two runs carried out with the catalyst described in the instant example in accordance with the pilot plant procedure and the feed described in Example II.

TABLE 5

| the present examples, a catalyst | | | | | |
|---|---|---|---|---|---|
| Time on stream, hrs* | 56 | 147 | 179 | 275 | 316 |
| Avg. Cat. Temp., °F. | 573 | 575 | 598 | 624 | 625 |
| LHSV | .50 | .63 | .50 | .50 | .38 |
| H₂, SCFB | 5442 | 5495 | 4108 | 4809 | 4023 |
| Pressure, psig | 800 | 800 | 800 | 800 | 800 |
| Yields, wt % | | | | | |
| IBP-360° F. | 6.5 | 6.7 | 9.3 | 11.2 | 5.9 |
| 360–650° F. | 10.7 | 8.7 | 7.4 | 10.1 | 8.2 |
| Lube Oil | 64.9 | 77.8 | 74.0 | 65.2 | 62.8 |
| Total Liquid | 82.4 | 93.2 | 90.7 | 85.4 | 84.1 |
| Properties of Lube Oil | | | | | |
| Gravity | 30.1 | 30.2 | 30.4 | 30.2 | 29.9 |
| Pour pt, °F. | 35 | 70 | 55 | 25 | 15 |
| Viscosity cSt @ 100° C. | 6.34 | 5.86 | 5.93 | 6.17 | 6.27 |
| Viscosity cSt @ 40° C. | 42.97 | 37.42 | 39.25 | 42.37 | 44.01 |
| Viscosity index | 94 | 97 | 91 | 88 | 86 |
| Sulfur, wt % | .050 | .095 | .135 | .046 | .032 |
| Nitrogen, ppm | 4.3 | 5.1 | 4.4 | 3.1 | 2.2 |
| *Run 1 | | | | | |
| Time on stream, hrs | 412 | 465 | 513 | 586 | 678 |
| Avg. Cat. Temp., °F. | 601 | 601 | 601 | 580 | 580 |
| LHSV | .38 | .50 | .50 | .50 | .50 |
| H₂, SCFB | 5281 | 5178 | 5287 | 5267 | 5201 |
| Pressure, psig | 800 | 800 | 400 | 400 | 400 |
| Yields, wt % | | | | | |
| IBP-360° F. | 9.7 | 5.9 | 8.5 | 5.0 | 5.1 |
| 360–650° F. | 7.4 | 8.2 | 5.0 | 6.4 | 5.6 |
| Lube Oil | 72.2 | 76.4 | 73.9 | 80.0 | 78.9 |
| Total Liquid | 89.4 | 90.8 | 87.4 | 91.4 | 89.6 |
| Properties of Lube Oil | | | | | |
| Gravity | 30.4 | 30.6 | 30.2 | 30.6 | 30.3 |
| Pour pt, °F. | 25 | 55 | 45 | 60 | 65 |
| Viscosity cSt @ 100° C. | 5.96 | 5.86 | 5.95 | 5.74 | 5.73 |
| Viscosity cSt @ 40° C. | 39.00 | 37.44 | 39.60 | 35.89 | 35.48 |
| Viscosity index | 94 | 97 | 90 | 99 | 100 |
| Sulfur, wt % | .060 | .073 | .089 | .113 | .108 |
| Nitrogen, ppm | 3.9 | 7.7 | 9.3 | 8.4 | 8.5 |
| Time on stream, hrs* | 96 | 170 | 242 | 313 | |
| Avg. Cat. Temp., °F. | 575 | 600 | 625 | 575 | |
| LHSV | .5 | .5 | .5 | .5 | |
| H₂, SCFB | 5175 | 5074 | 5138 | 5269 | |
| Pressure, psig | 400 | 400 | 400 | 400 | |
| Yields, wt % | | | | | |
| IBP-360° F. | 8.8 | 8.3 | 8.2 | 4.9 | |
| 360–650° F. | 8.2 | 8.6 | 8.4 | 7.7 | |
| Lube Oil | 67.5 | 69.0 | 66.9 | 79.7 | |
| Total Liquid | 84.9 | 85.9 | 83.5 | 92.3 | |
| Properties of Lube Oil | | | | | |
| Gravity | 29.4 | 29.6 | 30.2 | 31.1 | |
| Pour pt, °F. | 35 | 25 | 15 | 55 | |
| Viscosity cSt @ 100° C. | 6.33 | 6.37 | 6.31 | 5.85 | |
| Viscosity cSt @ 40° C. | 45.28 | 45.36 | 44.61 | 36.30 | |
| Viscosity index | 83 | 85 | 85 | 102 | |
| Sulfur, wt % | .105 | .089 | .068 | .115 | |
| Nitrogen, ppm | 6.9 | 6.6 | 6.1 | 8.3 | |
| *Run 2 | | | | | |

EXAMPLE V

The experiment in the present Example was carried out for comparative purposes. A catalyst support component was prepared using ZSM-5 as the sieve component of the support. The particular ZSM-5 utilized possessed a 30:1 SiO₂:Al₂O₃ ratio and was in the hydrogen form.

The preparation procedure involved adding 30 g of Stearatex to 350 g of ZSM-5 and mixing the same. The mixed powder was then placed in a speed muller where 2534 g of alumina hydrosol (10 wt% Al₂O₃ on a dry basis) were also added. The admixture was mulled for 3 minutes. Subsequently, 250 g H₂O were added to the speed muller and the contents mulled for an additional 3 minutes. A gelling solution containing 120 ml NH₄OH and 120 ml H₂O was then added to the above mixture. The gel was then dried overnight at 250° F. The dried gel was then ground to a powder in a Retsch grinder.

501 g of the above powder were then added to the speed muller together with a total of 340 ml H₂O. The powder-water mixture was then speed-mulled for a total of 22 minutes. The above speed-mulled mixture was then extruded through a 5/64 inch die plate. The extrudate was subsequently dried for a two-day period at 250° F.

The above 60 wt% ZSM-5/40 wt% Al₂O₃ support material was then impregnated in a conventional manner to yield a catalyst containing 0.5 wt% Pd. The present catalyst was designated as Catalyst D.

80 cc of the subject comparative catalyst were then tested in the pilot plant in the manner set out in Example II.

The feedstocks employed in the instant tests were a SAE-10 wt oil as described above in Example II and a phenol-extracted SAE-40 wt oil (designated "RAF-40") having the following properties.

| Sulfur | .306 wt % |
|---|---|
| C | 86.10 wt % |
| H | 13.49 wt % |
| Total Nitrogen | 167 ppm |
| Basic Nitrogen | 45 |
| Pour Point | 140° F. |
| Viscosity @ 100° C. | 13.31 cSt |

The following Table 6 sets forth the results of the tests.

TABLE 6

| Time on stream, hrs | 22 | 46 | 70 | 94 | 118 |
|---|---|---|---|---|---|
| Avg. Cat. Temp., °F. | 601 | 601 | 601 | 601 | 600 |
| LHSV | .48 | .49 | .51 | .48 | .43 |
| H₂, SCFB | 3778 | 5215 | 5067 | 5372 | 5800 |
| Pressure, psig | 800 | 800 | 800 | 800 | 800 |
| Feed | RAF-10 | RAF-10 | RAF-10 | RAF-10 | RAF-10 |
| Yields, wt % | | | | | |
| Methane | .36 | .50 | .26 | .28 | .26 |
| Ethane | 1.24 | 1.71 | .97 | 1.02 | .96 |
| Propane | 12.44 | 17.17 | 12.14 | 12.87 | 12.99 |
| Butane | 5.82 | 8.03 | 7.39 | 7.83 | 8.42 |
| C₅⁺ naphtha | 2.69 | 3.5 | 4.25 | 4.18 | 3.72 |
| Distillate | 5.81 | 3.23 | 2.75 | 3.86 | 5.45 |
| Lube Oil | 50.92 | 58.27 | 57.64 | 59.25 | 62.23 |
| Total Liquid | 59.42 | 65.00 | 64.65 | 67.30 | 71.40 |
| Properties of Lube Oil | | | | | |
| Pour pt, °F. | −30 | −30 | −35 | −30 | −30 |
| Viscosity cSt @ 100° C. | 6.92 | 6.73 | 6.70 | 6.92 | 6.75 |
| Viscosity cSt @ 40° C. | 57.57 | 54.07 | 53.04 | 57.57 | 53.92 |

TABLE 6-continued

| | | | | | |
|---|---|---|---|---|---|
| Viscosity index | 65 | 68 | 70 | 65 | 69 |
| Sulfur, wt % | 390 | 430 | 520 | 570 | 570 |
| Nitrogen, ppm | 3.0 | 3.5 | 6.7 | 5.9 | 6.2 |
| Time on stream, hrs | 164 | 194 | 218 | 236 | 308 |
| Avg. Cat. Temp., °F. | 649 | 703 | 700 | 700 | 700 |
| LHSV | .56 | .53 | .22 | .28 | .26 |
| $H_2$, SCFB | 3288 | 6663 | 11424 | 6378 | 9206 |
| Pressure, psig | 800 | 800 | 800 | 800 | 800 |
| Feed | RAF-40 | RAF-40 | RAF-40 | RAF-40 | RAF-40 |
| Yields, wt % | | | | | |
| Methane | .04 | .22 | .38 | .16 | .21 |
| Ethane | .23 | 1.24 | 2.12 | .77 | 1.00 |
| Propane | 2.82 | 9.31 | 15.97 | 5.71 | 7.70 |
| Butane | 2.42 | 6.57 | 11.26 | 4.33 | 5.94 |
| $C_5^+$ naphtha | 3.94 | 6.09 | 6.38 | 3.76 | 5.18 |
| Distillate | 4.97 | 7.98 | 12.45 | 10.91 | 10.61 |
| Lube Oil | 71.23 | 67.78 | 54.91 | 55.52 | 62.76 |
| Total Liquid | 80.20 | 81.85 | 73.74 | 70.19 | 78.55 |
| Properties of Lube Oil | | | | | |
| Pour pt, °F. | 55 | 35 | — | 10 | 20 |
| Viscosity cSt @ 100° C. | 16.51 | 16.40 | 16.00 | 16.49 | 16.37 |
| Viscosity cSt @ 40° C. | 195.30 | 197.50 | 198.00 | 204.90 | 198.75 |
| Viscosity index | 87 | 85 | 80 | 82 | 84 |
| Sulfur, wt % | 2030 | 1410 | 940 | 800 | 860 |
| Nitrogen, ppm | 74.0 | 112.0 | 70.0 | 69.0 | 30.0 |
| Time on stream, hrs | 332 | 357 | 380 | 404 | 428 |
| Avg. Cat. Temp., °F. | 700 | 700 | 701 | 701 | 704 |
| LHSV | .26 | .30 | .26 | .24 | .24 |
| $H_2$, SCFB | 9919 | 18629 | 18887 | 19860 | 18107 |
| Pressure, psig | 800 | 800 | 800 | 800 | 800 |
| Feed | RAF-40 | RAF-40 | RAF-40 | RAF-40 | RAF-40 |
| Yields, wt % | | | | | |
| Methane | .22 | .21 | .21 | .15 | .14 |
| Ethane | .84 | .96 | .98 | .71 | .64 |
| Propane | 8.18 | 7.65 | 7.75 | 6.09 | 5.55 |
| Butane | 6.49 | 6.46 | 6.55 | 5.68 | 5.18 |
| $C_5^+$ naphtha | 8.33 | 5.90 | 5.45 | 5.94 | 5.82 |
| Distillate | 9.72 | 9.52 | 13.74 | 13.59 | 13.00 |
| Lube Oil | 59.11 | 60.76 | 56.79 | 58.32 | 59.12 |
| Total Liquid | 77.16 | 76.18 | 75.99 | 77.86 | 77.94 |
| Properties of Lube Oil | | | | | |
| Pour pt, °F. | 5 | 10 | 5 | 15 | 10 |
| Viscosity cSt @ 100° C. | 16.16 | 16.27 | 16.48 | 16.72 | 16.31 |
| Viscosity cSt @ 40° C. | 198.80 | 199.70 | 200.15 | 209.46 | 204.69 |
| Viscosity index | 81 | 82 | 84 | 82 | 80 |
| Sulfur, wt % | 960 | 910 | 700 | 700 | 710 |
| Nitrogen, ppm | 90.0 | 77.0 | 43.0 | 28.0 | 30.0 |
| Time on stream, hrs | 457 | 478 | 530 | 548 | 572 |
| Avg. Cat. Temp., °F. | 600 | 600 | 601 | 600 | 599 |
| LHSV | .49 | .52 | .55 | .49 | .49 |
| $H_2$, SCFB | 5243 | 4734 | 4480 | 5423 | 5739 |
| Pressure, psig | 800 | 800 | 800 | 800 | 800 |
| Feed | RAF-40 | RAF-40 | RAF-40 | RAF-40 | RAF-40 |
| Yields, wt % | | | | | |
| Methane | .02 | .02 | .04 | .05 | .02 |
| Ethane | .18 | .17 | .32 | .39 | .20 |
| Propane | 3.66 | 3.44 | 4.96 | 6.00 | 4.11 |
| Butane | 4.36 | 4.09 | 5.56 | 6.71 | 4.76 |
| $C_5^+$ naphtha | 9.38 | 7.62 | 4.44 | 5.67 | 11.48 |
| Distillate | 3.69 | 2.74 | 8.42 | 2.32 | .26 |
| Lube Oil | 74.74 | 72.84 | 64.86 | 70.24 | 65.69 |
| Total Liquid | 87.24 | 83.19 | 77.72 | 78.23 | 77.43 |
| Properties of Lube Oil | | | | | |
| Pour pt, °F. | 45 | 30 | −15 | −5 | 5 |
| Viscosity cSt @ 100° C. | 6.38 | 6.13 | 6.42 | 6.33 | 6.28 |
| Viscosity cSt @ 40° C. | 44.95 | 42.29 | 47.39 | 45.84 | 46.92 |
| Viscosity index | 87 | 86 | 80 | 80 | 73 |
| Sulfur, wt % | 1240 | 1200 | 840 | 960 | 1040 |
| Nitrogen, ppm | 19.0 | 14.0 | 5.3 | 8.1 | 10.0 |
| Time on stream, hrs | 596 | | | | 626 |
| Avg. Cat. Temp., °F. | 599 | | | | 528 |
| LHSV | .48 | | | | .46 |
| $H_2$, SCFB | 6241 | | | | 5171 |
| Pressure, psig | 800 | | | | 800 |
| Feed | RAF-10 | | | | RAF-10 |
| Yields, wt % | | | | | |
| Methane | .02 | | | | .01 |
| Ethane | .22 | | | | .13 |
| Propane | 4.47 | | | | 2.85 |
| Butane | 5.18 | | | | 3.33 |
| $C_5^+$ naphtha | 10.05 | | | | 8.14 |
| Distillate | 2.40 | | | | 5.57 |
| Lube Oil | 69.36 | | | | 65.62 |
| Total Liquid | 81.80 | | | | 79.34 |
| Properties of Lube Oil | | | | | |
| Pour pt, °F. | 15 | | | | −10 |
| Viscosity cSt @ 100° C. | 6.23 | | | | 6.40 |
| Viscosity cSt @ 40° C. | 43.70 | | | | 49.23 |
| Viscosity index | 85 | | | | 69 |
| Sulfur, wt % | 1020 | | | | 830 |
| Nitrogen, ppm | 10.0 | | | | 9.8 |

EXAMPLE VI

In the present example, a catalyst support was prepared in a similar manner to the support prepared in Example I. In the present example, however, the support contained 40 wt% HAMS-1B-3 and 60 wt% alumina.

HAMS-1B-3 was prepared by mixing ethylenediamine, $H_3BO_3$ acid, and tetra-n-propylammonium bromide (TPABr) in distilled water. To this mixture, a quantity of 40 wt% colloidal silica (Nalco 2327) was added. The mixture was then digested at about 145° to 150° C. until crystallization of the molecular sieve to a level of about greater than 80 wt% occurred. The product was then filtered, washed with distilled water, dried at 200° C. for about 16 hours and then calcined at about 950° to 1000° F. for about 12 hours.

The mole ratios of the reactants were about as follows: $H_2O/SiO_2=15$, ethylenediamine/$SiO_2=0.30$, $H_3BO_3/SiO_2=0.39$ and TPABr/$SiO_2=0.011$. The pH of the reaction mixture was about 9.8.

The HAMS-1B-3 borosilicates sieve differs from the HAMS-1B-2 and HAMS-1B-1 sieve in that the instant 1B-3 sieve contains substantially less sodium, 70 ppm versus 250 ppm for both 1B-1 and 1B-2 sieves. It is postulated that the 1B-3 sieve, by virtue of containing less sodium, results in reduced formation of the less stable Searlicite phase which phase decomposes upon calcination of the sieve. While not wishing to be bound by theory, it is speculated that the decomposed Searlicite phase is less selective for dewaxing and thereby results in a loss in yield.

The 1B-3 borosilicate sieve aslo has a distinct crystalline morphology unlike that of the 1B-1 and 1B-2 sieves. In particular, inspection of the 1B-3 sieve with a scanning electron microscope (SEM) has shown that the sieve has a rod-like structure of about 0.2 micron in diameter whereas the 1B-1 and 1B-2 sieves are agglomerated in 0.2 micron in diameter spheres.

The 40 wt% HAMS-1B-3/60 wt% $Al_2O_3$ support component of the present example was impregnated in the conventional manner such that the final composite contained 0.5 wt% Pd. The final catalyst used in the present example had a surface area of 368 m²/g, a pore volume of 0.9168 cc/g, an average pore radius of 68 Å and a micropore volume of 0.0156 cc/g. The present catalyst was designated as Catalyst E.

The results of the dewaxing tests carried out in the manner elucidated in Example II are set out in Table 7 below. The tests were carried out with phenol-extracted SAE-10 and SAE-40 wt oils.

TABLE 7

| Time on stream, hrs | 29 | 92 | 117 | 140 | 191 |
|---|---|---|---|---|---|
| Avg. Cat. Temp., °F. | 598 | 598 | 598 | 599 | 673 |
| LHSV | .51 | .51 | .51 | .51 | .26 |
| $H_2$, SCFB | 5142 | 5491 | 5419 | 5380 | 10800 |
| Pressure, psig | 800 | 800 | 800 | 800 | 800 |
| Feed | RAF-10 | RAF-10 | RAF-10 | RAF-10 | RAF-40 |
| Yields, wt % | | | | | |
| Methane | .18 | .00 | .00 | .00 | .03 |
| Ethane | 1.01 | .04 | .03 | .03 | .29 |
| Propane | 13.28 | 3.45 | 3.25 | 3.19 | 8.97 |
| Butane | 6.78 | 3.04 | 2.82 | 2.79 | 7.95 |
| $C_5^+$ naphtha | 8.34 | 14.57 | 14.47 | 14.54 | 20.37 |
| Distillate | 9.31 | 4.31 | 3.99 | 3.11 | 24.80 |
| Lube Oil | 30.41 | 65.89 | 70.96 | 71.02 | 25.99 |
| Total Liquid | 48.06 | 84.77 | 89.42 | 88.67 | 71.16 |
| Properties of Lube Oil | | | | | |
| Pour pt, °F. | −35 | −30 | −5 | −10 | −10 |
| Viscosity cSt @ 100° C. | — | 6.13 | 5.99 | 5.95 | — |
| Viscosity cSt @ 40° C. | — | 43.73 | 41.20 | 40.79 | — |
| Viscosity index | — | 80 | 84 | — | — |
| Sulfur, wt % | — | 120 | 140 | — | — |
| Nitrogen, ppm | — | 1.6 | 4.1 | — | — |
| Time on stream, hrs | 248 | 284 | 313 | 334 | 457 |
| Avg. Cat. Temp., °F. | 637 | 637 | 650 | 650 | 702 |
| LHSV | .27 | .26 | .26 | .26 | .26 |
| $H_2$, SCFB | 11122 | 11102 | 9579 | 10711 | 10468 |
| Pressure, psig | 800 | 800 | 800 | 800 | 800 |
| Feed | RAF-40 | RAF-40 | RAF-40 | RAF-40 | RAF-40 |
| Yields, wt % | | | | | |
| Methane | .01 | .01 | .02 | .02 | .06 |
| Ethane | .06 | .06 | .09 | .12 | .29 |
| Propane | 3.20 | 3.19 | 3.41 | 4.21 | 6.39 |
| Butane | 3.23 | 3.22 | 3.42 | 4.15 | 5.88 |
| $C_5^+$ naphtha | 6.29 | 9.32 | 7.94 | 10.92 | 16.34 |
| Distillate | 9.40 | 7.01 | 6.85 | 7.91 | 19.50 |
| Lube Oil | 70.84 | 73.18 | 62.12 | 71.65 | 56.22 |
| Total Liquid | 86.53 | 89.52 | 76.90 | 90.49 | 86.06 |
| Properties of Lube Oil | | | | | |
| Pour pt, °F. | 30 | 30 | 25 | 30 | 0 |
| Viscosity cSt @ 100° C. | 15.66 | 16.05 | 15.73 | 15.57 | — |
| Viscosity cSt @ 40° C. | 178.00 | 186.93 | 183.00 | 181.30 | — |
| Viscosity index | 88 | 87 | 86 | 86 | — |
| Sulfur, wt % | 870 | 940 | 800 | 710 | — |
| Nitrogen, ppm | 45.0 | 54.0 | 46.0 | 40.0 | — |
| Time on stream, hrs | 478 | 502 | 526 | 598 | 623 |
| Avg. Cat. Temp., °F. | 697 | 696 | 699 | 700 | 722 |
| LHSV | .27 | .26 | .26 | .26 | .26 |
| $H_2$, SCFB | 10482 | 10422 | 10438 | 10571 | 10492 |
| Pressure, psig | 800 | 800 | 800 | 800 | 800 |
| Feed | RAF-40 | RAF-40 | RAF-40 | RAF-40 | RAF-40 |
| Yields, wt % | | | | | |
| Methane | .05 | .06 | .05 | .05 | .11 |
| Ethane | .22 | .32 | .29 | .23 | .59 |
| Propane | 6.10 | 6.84 | 6.28 | 5.32 | 8.75 |
| Butane | 5.49 | 6.18 | 5.67 | 5.65 | 7.23 |
| $C_5^+$ naphtha | 12.76 | 5.18 | 11.56 | 5.29 | 12.98 |
| Distillate | 17.02 | 20.76 | 14.12 | 17.61 | 17.77 |
| Lube Oil | 53.31 | 55.44 | 55.22 | 61.71 | 49.03 |
| Total Liquid | 83.09 | 81.38 | 80.90 | 84.61 | 79.78 |
| Properties of Lube Oil | | | | | |
| Pour pt, °F. | 0 | 0 | 0 | 20 | 0 |
| Viscosity cSt @ 100° C. | — | 13.51 | 13.60 | 13.77 | 13.71 |

TABLE 7-continued

| Viscosity cSt @ 40° C. | — | 142.80 | 142.60 | 143.60 | — |
|---|---|---|---|---|---|
| Viscosity index | — | 88 | 89 | 91 | — |
| Sulfur, wt % | — | — | — | — | — |
| Nitrogen, ppm | — | — | — | — | — |
| Time on stream, hrs | 645 | 669 | 692 | 740 | 836 |
| Avg. Cat. Temp., °F. | 723 | 725 | 725 | 723 | 749 |
| LHSV | .26 | .26 | .26 | .41 | .41 |
| $H_2$, SCFB | 10277 | 10250 | 10090 | 6336 | 5988 |
| Pressure, psig | 800 | 800 | 800 | 800 | 800 |
| Feed | RAF-40 | RAF-40 | RAF-40 | RAF-40 | RAF-40 |
| Yields, wt % | | | | | |
| Methane | .11 | .13 | .13 | .05 | .18 |
| Ethane | .53 | .69 | .68 | .15 | .69 |
| Propane | 8.26 | 9.87 | 9.72 | 3.55 | 7.26 |
| Butane | 6.84 | 7.80 | 7.68 | 2.87 | 4.99 |
| $C_5^+$ naphtha | 13.90 | 16.01 | 15.85 | 9.23 | 9.44 |
| Distillate | 19.17 | 20.33 | 19.32 | 9.87 | 24.78 |
| Lube Oil | 37.73 | 31.99 | 29.10 | 63.46 | 35.22 |
| Total Liquid | 70.80 | 68.33 | 64.26 | 82.56 | 69.44 |
| Properties of Lube Oil | | | | | |
| Pour pt, °F. | 0 | −10 | −20 | 20 | 20 |
| Viscosity cSt @ 100° C. | — | — | — | 13.25 | — |
| Viscosity cSt @ 40° C. | — | — | — | 134.00 | — |
| Viscosity index | — | — | — | 92 | — |
| Sulfur, wt % | — | — | — | — | — |
| Nitrogen, ppm | — | — | — | — | — |

DISCUSSION OF TEST RESULTS

A least squares fit analysis of the data obtained from Examples II through VI was used to obtain the following comparative figures for a 5° F. pour point product as set out in Table 8 below.

As is readily evident from the Table, the catalyst containing the b 1B-3 borosilicate sieve, Catalyst E, provided superior results for lube yield, total liquid product yield, and viscosity index.

The lube yields for two of the borosilicate-containing catalysts (catalysts A and E) were superior to the comparative ZSM-5-containing catalyst (Catalyst D). Further, the total liquid product yields and viscosity indexes of the lube oil fractions achieved with the invention borosilicate-containing catalysts (Catalysts A, C, and E) are all superior to the ZSM-5-containing comparative catalyst, catalyst D.

TABLE 8

| Catalyst | Lube Yield, wt % | Total Liquid Yield, wt % | VI |
|---|---|---|---|
| A (invention) | 71.3 | 84.2 | 86 |
| B (comparative) | 67.4 | 84.1 | 87 |
| C (invention) | 61.8 | 82.3 | 83 |
| D (comparative) | 67.2 | 74.1 | 79 |
| E (invention) | 73.7 | 90.9 | 90 |

Finally, it should be noted that the lube yields for catalysts A and E were greater than that achieved with catalyst B, the nickel-borosilicate-containing catalyst, for a lube product possessing about the same (catalyst A) or a greater (catalyst E) viscosity index.

EXAMPLE VII

An NMP-extracted SAE-10 raffinate was hydrotreated in a fixed bed, downflow, pilot plant associated with automatic controls to maintain constant flow of gas and feed and constant temperature and pressure. 128 cc of HDS-3A, a commercially available American Cyanamid Ni-Mo-containing hydrotreating catalyst were loaded into a 0.75" inside diameter reactor having a bed length of 20-½". The catalyst was presulfided with 8 vol% $H_2S$ in hydrogen at 300° F. for one hour, 400° F. for one hour, and 600° F. for one hour. The feed was then hydrotreated at a total unit pressure of 800 psig, a temperature of 675° F., and a liquid feed rate of 0.50 volume of feed per volume of catalyst per hour (LHSV) ($V_o/V_c$/hrs) at a constant gas flow rate corresponding to 800 standard cubic feet per barrel (SCFB). The product was collected over several days and stripped of $H_2S$ in a five-gallon can with nitrogen until $H_2S$ could not be detected using a Drager tube.

The properties of a phenol extracted SAE-10 raffinate, the feed to the hydrotreater and hydrotreated product are set out below in Table 9:

TABLE 9

|  | Phenol SAE-10 Raffinate | NMP SAE-10 Raffinate | Hydrotreated NMP SAE-10 Raffinate |
|---|---|---|---|
| API Gravity | 32.4 | 33.3 | 35.6 |
| Pour Point, °F. | 100 | 100 | 100 |
| Viscosity cSt @ 40° C. | — | 25.03 | 18.46 |
| Viscosity cSt @ 100° C. | 4.92 | 4.89 | 4.10 |
| Elemental Analysis |  |  |  |
| C, wt % | 86.10 | 85.99 | 85.94 |
| H, wt % | 13.49 | 13.78 | 13.90 |
| S, ppm | 1720 | 1740 | 11 |
| Total N, ppm | 13 | 81 | 1.1 |
| Basic N, ppm | 7 | 54 | <5 |
| NMP, ppm | 0 | 11.5 | — |

A physical and chemical inspection analysis for HDS-3 hydrotreating catalyst is set out below in Table 10.

TABLE 10

| CATALYST INSPECTION FOR HDS-3 | |
|---|---|
| Composition | |
| $MoO_3$, wt. % | 15.3 |
| NiO, wt. % | 3.3 |
| Surface Properties | |
| BET Surface Area, $m^2/g$ | 202 |
| Pore Volume, cc/g | |
| in 20–50 Å dia pores | 0.05 |
| 50–100 | 0.44 |
| 100–150 | 0.11 |
| 150–200 | 0.01 |
| 200+ | 0.02 |
| Total | 0.62 |
| Average pore diameter, Å | 123 |
| Bulk density, g/cc | 0.74 |

The dewaxing catalyst used in the dewaxing step of the process of the invention was prepared as follows. Sufficient alumina sol (containing approximately 9 wt.% $Al_2O_3$) and HAMS-1B-3 to make a 40 wt.% HAMS-1B-3/60 wt.% $Al_2O_3$ catalyst on a dry basis were placed in an Eirich intensive mixer. The slurry was blended for approximately one minute.

A gelling solution was prepared by mixing concentrated ammonium hydroxide solution (28.4 wt%) with distilled water to give a $NH_4OH$ concentration of about 22.7 wt.%. The gellation ratio was 0.20 g $NH_4OH$ per gram of $Al_2O_3$. 1.0 cc of diluted gelling solution was used per gram of $Al_2O_3$. The gelling solution was poured into the intensive mixer and the slurry was blended at a high rate for several minutes. The slurry was then removed from the intensive mixer and dried in an oven overnight at 250° F. The alumina-sieve cake was then broken up and ground to approximately 325 mesh in a Retsch screen mill. The milled powder was returned to the intensive mixer where it was blended with distilled water and densified prior to extrusion. The dough mass was then extruded using a stainless steel die plate with 1/16"-diameter holes. No extrusion aids were used in this preparation.

After extrusion, the extrudate was dried overnight at 250° F. in a convection oven. The extrudate was then dish calcined at 500° C. for three hours in an air-purged furnace. The finished base was analyzed by the Digisorb method and was found to have a BET surface area of 345 $m^2g$ and a desorption pore volume of 0.7135 cc/g.

Palladium was then incorporated in the above-described base by the following procedure. An impregnation solution was prepared such that it contained 0.6 g Pd/liter distilled water using a 10 wt% $Pd(NO_3)_2$ solution. $NH_4NO_3$ was also added in an amount such that the solution contained $NH_4NO_3$ in a concentration of 200 moles $NH_4OH$ per mole Pd.

The extrudate described above was then added to a drum which permitted circulation of the impregnation solution therethrough. The impregnation was continued for about two hours. After two hours, the solution, which had cleared, was decanted. The extrudate was then washed and decanted ten times with fresh distilled water and was finally filtered. The wet extrudate was subsequently dried at approximately 122° C. overnight to yield a finished catalyst. The finished catalyst was thereafter calcined for three hours in flowing air at 500° C.

The finished catalyst possessed the following properties as set out below in Table 11:

TABLE 11

| CATALYST INSPECTION FOR DEWAXING CATALYST | |
|---|---|
| Palladium, wt % | 0.241 |
| Boron, wt % | 0.57 |
| Sodium, ppm | 78 |
| BET surface area, $m^2/g$ | 345 |
| Pore volume, cc/g | 0.7135 |

128 cc of the above-described catalyst were then loaded into a pilot plant. The subject pilot plant consisted of a five-zone, electrically-heated, ¾"-diameter schedule 40 reactor. The reactor was operated in downflow, fixed-bed configuration with the temperatures being monitored with an axial-travelling thermocouple. Gas and liquid products were recovered and analyzed and daily mass balances were taken. All runs were conducted at 800 psig in pure hydrogen. The total gas flow rate was held at 5000 standard cubic feet per barrel at a liquid hourly space velocity of 0.50 volume of feed per volume of catalyst per hour.

After the catalyst charge was loaded into the reactor, the catalyst was heated in the flowing hydrogen at 800 psig to 550° F. and held there for 3 hours before oil was introduced. Phenol-extracted SAE-10 raffinate was then charged to the reactor for about 300 hours. The feed was then charged to NMP-extracted SAE-10 raffinate. After about 125 hours of NMP-extracted SAE-10 raffinate feed to the reactor, the dewaxing catalyst was rejuvenated. A hydrogen rejuvenation treatment was carried out overnight at 900° F. and 800 psig. Because the catalyst had undergone the above-described rejuvenation, the catalyst was first contacted with phenol-extracted SAE-10 raffinate for about 70 hours in order to determine how successful the rejuvenation had been. The initial lube oil pour point after rejuvenation was found to be −35° F. which indicated rejuvenation. Subsequently, the feed was switched to the hydrotreated NMP-extracted SAE-10 raffinate. The hydrotreating step was carried out as explained above.

DISCUSSION OF RESULTS

Table 12 below sets out the operating conditions and results for the run described above. In the Table, phenol-10 designates a phenol-extracted SAE-10 raffinate, NMP-10 designates a NMP-extracted SAE-10 raffinate, and HNMP-10 designates a hydrotreated NMP-extracted SAE-10 raffinate.

ated over the catalyst are small enough to enter the borosilicate pore structure and become adsorbed on the active acid sites. It is believed that because NMP-extracted feeds contain more basic nitrogen molecules than phenol-extracted feeds, a greater degree of poisoning and a consequent increase in deactivation results therefrom.

As can be further observed from Table 12, once the hydrotreated NMP-extracted raffinate was charged to the dewaxing reactor, the pour point of the lube oil was found to increase from −15° F. for the phenol-extracted raffinate to +15° F. with the hydrotreated

TABLE 12

| Time on stream, hrs | 25 | 47 | 75 | 98 | 157 | 181 | 225 | 276 | 325 | 348 |
|---|---|---|---|---|---|---|---|---|---|---|
| Avg. Cat. Temp., °F. | 567 | 563 | 562 | 562 | 601 | 630 | 625 | 628 | 626 | 626 |
| LHSV | .50 | .50 | .50 | .50 | .50 | .50 | .50 | .50 | .50 | .50 |
| $H_2$, SCFB | 7866 | 7691 | 5343 | 5343 | 5286 | 5219 | 5219 | 5145 | 5294 | 5294 |
| Pressure, psig | 800 | 800 | 800 | 800 | 800 | 800 | 800 | 800 | 800 | 800 |
| Feed | phenol-10 | phenol-10 | phenol-10 | phenol-10 | phenol-10 | phenol-10 | phenol-10 | phenol-10 | NMP-10 | NMP-10 |
| Yields, wt % | | | | | | | | | | |
| Methane | .04 | .03 | .02 | .01 | .00 | .00 | .01 | .01 | .00 | .00 |
| Ethane | .17 | .17 | .11 | .05 | .04 | .04 | .08 | .08 | .04 | .04 |
| Propane | 5.77 | 5.64 | 4.09 | 2.80 | 3.79 | 3.75 | 4.87 | 4.80 | 3.75 | 3.75 |
| Butane | 7.38 | 7.22 | 5.21 | 3.99 | 4.49 | 4.43 | 5.27 | 5.19 | 4.56 | 4.56 |
| $C_5^+$ naphtha | 14.89 | 14.08 | 16.78 | 13.33 | 13.90 | 11.26 | 16.13 | 15.54 | 12.23 | 9.26 |
| Distillate | 4.38 | 2.88 | 2.95 | 2.02 | 2.26 | 2.23 | 2.41 | 1.86 | 2.06 | 1.74 |
| Lube Oil | 57.02 | 57.64 | 80.19 | 76.95 | 76.27 | 70.54 | 73.61 | 71.34 | 79.35 | 81.45 |
| Total Liquid | 76.29 | 74.60 | 99.92 | 92.30 | 92.43 | 84.02 | 92.15 | 88.74 | 93.64 | 92.45 |
| Properties of Lube Oil | | | | | | | | | | |
| Pour pt, °F. | −25 | −25 | 0 | 50 | 10 | −10 | −20 | −15 | 25 | 40 |
| Viscosity cSt @ 100° C. | 6.25 | 6.18 | 5.98 | 5.80 | 5.82 | 5.76 | 5.77 | 5.70 | 5.82 | 5.76 |
| Viscosity cSt @ 40° C. | 47.70 | 45.51 | 42.29 | 38.52 | 38.88 | 38.79 | 38.49 | 37.58 | 38.12 | 37.14 |
| Viscosity index | 68 | 74 | 78 | 88 | 87 | 84 | 86 | 87 | 91 | 93 |
| Sulfur, wt % | — | — | — | — | — | — | — | — | — | — |
| Nitrogen, ppm | 4.0 | 3.5 | 6.5 | 3.2 | 4.9 | 3.7 | 33.4 | 3.6 | 33.8 | 45.7 |
| Time on Stream, hrs | 370 | 392 | 445 | 468 | 493 | 515 | 537 | 565 | 589 | 613 |
| Avg. Cat. Temp., °F. | 626 | 626 | 597 | 597 | 598 | 599 | 599 | 600 | 629 | 599 |
| LHSV | .50 | .50 | .50 | .50 | .50 | .50 | .50 | .50 | .50 | .50 |
| $H_2$, SCFB | 5294 | 5294 | 5111 | 4925 | 4949 | 4949 | 4949 | 5096 | 5106 | 4911 |
| Pressure, psig | 800 | 800 | 800 | 800 | 800 | 800 | 800 | 800 | 800 | 800 |
| Feed | NMP-10 | NMP-10 | phenol-10 | phenol-10 | HNMP-10 | HNMP-10 | HNMP-10 | HNMP-10 | HNMP-10 | HNMP-10 |
| Yields, wt % | | | | | | | | | | |
| Methane | .00 | .00 | .02 | .01 | .01 | .00 | .00 | .00 | .02 | .01 |
| Ethane | .02 | .02 | .18 | .09 | .09 | .02 | .02 | .03 | .13 | .05 |
| Propane | 2.48 | 2.48 | 4.83 | 3.82 | 3.91 | 2.56 | 2.56 | 2.97 | 5.95 | 4.08 |
| Butane | 3.23 | 3.23 | 6.70 | 2.93 | 3.00 | 3.20 | 3.20 | 3.57 | 6.06 | 4.79 |
| $C_5^+$ naphtha | 10.44 | 10.04 | 21.71 | 19.29 | 14.24 | 14.26 | 16.01 | 17.60 | 23.87 | 19.97 |
| Distillate | 2.14 | 2.46 | 6.11 | 5.33 | 8.75 | 9.14 | 7.67 | 12.94 | 17.91 | 11.29 |
| Lube Oil | 80.25 | 71.91 | 55.04 | 60.74 | 66.59 | 68.94 | 70.87 | 63.87 | 42.73 | 59.97 |
| Total Liquid | 92.82 | 84.41 | 82.86 | 85.36 | 88.57 | 92.34 | 94.55 | 94.41 | 84.51 | 91.22 |
| Properties of Lube Oil | | | | | | | | | | |
| Pour pt, °F. | 50 | 55 | −35 | −15 | 15 | 25 | 15 | −15 | −70 | −40 |
| Viscosity cSt @ 100° C. | 5.75 | 5.77 | 5.68 | 5.84 | 5.38 | 5.19 | 4.91 | 5.20 | 4.76 | 5.11 |
| Viscosity cSt @ 40° C. | 36.86 | 36.48 | 39.01 | 40.04 | 32.91 | 30.57 | 28.04 | 30.92 | 27.55 | 30.55 |
| Viscosity index | 94 | 97 | 77 | 82 | 95 | 98 | 96 | 96 | 86 | 92 |
| Sulfur, wt % | — | — | — | — | — | — | — | — | — | — |
| Nitrogen, ppm | 50.9 | 54.3 | 5.2 | 5.5 | 2.6 | 1.6 | 1.1 | 5.9 | 1.7 | 2.9 |

As can be seen from Table 12, while the lube oil pour point during operation on the phenol-extracted SAE-10 raffinate remained relatively constant at about −15° F. upon introduction of the NMP-extracted SAE-10 raffinate, the lube pour point increased immediately by about 40° F. with a deactivation rate of about 11° F./day in pour point.

The only significant difference between the two SAE-10 feeds was the nitrogen content. NMP-extracted SAE-10 raffinate contained 54 ppm basic nitrogen, 81 ppm total nitrogen and 11.5 ppm NMP while the phenol SAE-10 raffinate contained only 7 ppm basic nitrogen, 13 ppm total nitrogen, and no NMP. While not wishing to be bound by any theory, it is speculated that the basic nitrogen molecules such as NMP and ammonia gener- NMP-extracted feed. After about 3 days charge of the hydrotreated feed, the catalyst began to reactivate.

In order to achieve a direct comparison between the steady-state catalyst performance with the phenol-extracted feed, NMP-extracted feed, and hydrotreated NMP-extracted feed, the reactor temperature was increased to 625° F. At these conditions, the pour point of the lube oil was dramatically decreased to −70° F., thus emphatically demonstrating the effect of hydrotreating to remove deleterious nitrogen compounds.

Another surprising result afforded by hydrotreating prior to dewaxing is the increase in VI achieved by the sequence of process steps prescribed by the invention.

Typically, there is a decrease in VI after a dewaxing step; however, prior hydrotreatment of the dewaxing influent results in a dramatic increase in VI. It should be noted that the process of the present invention results in a product possessing a very high VI at an extremely low pour point. For example, at a pour point of −40° F. at period No. 25, the product possessed a VI of 92.

As mentioned above, it is speculated that the hydrotreatment step reduces the sulfur level content of the dewaxing stage influent to the point where the dewaxing catalyst dehydrogenation component is not poisoned by the sulfur. This results in increased aromatics saturation as well as paraffin isomerization activity. The net result of these reactions is a decrease in pour point and an increase in viscosity index.

The following Table 13 sets out the results of a mass spectral analysis carried out on certain feed and product samples from the instant example to determine actual conversion of aromatics at each stage.

TABLE 13

| | MASS SPEC. INSPECTIONS | | | | | |
|---|---|---|---|---|---|---|
| | Phenol SAE-10 | Dewaxed Phenol SAE-10 | NMP-Extracted SAE-10 | Hydrotreated NMP SAE-10 | Dewaxed Hydrotreated NMP SAE-10 | Dewaxed Hydrotreated NMP SAE-10 |
| Mono Aromatics, Vol % | 6.0 | 6.0 | 6.4 | 4.7 | .5 | .8 |
| Total Aromatics, Vol % | 11.8 | 12.3 | 11.1 | 8.1 | 4.9 | 5.5 |
| Ave. Mol. Wt | — | 395 | 397 | 372 | 374 | 369 |
| Pour Pt, °F. | — | −15 | — | — | −15 | −40 |
| VI | — | 87 | — | — | 96 | 92 |

As can be gleaned from the above Table, while some aromatics saturation occurred in the hydrotreater, significant aromatics saturation in the dewaxing stage occurred when the feed thereto had been hydrotreated and did not occur to the same extent when the feed had not been prehydrotreated, as the dewaxed (absent hydrotreatment) phenol SAE-10 inspection shows that essentially no aromatics hydrogenation of the phenol SAE-10 feed occurred. Furthermore, it should be noted that such a significant aromatics saturation occurred at relatively low pressures.

What is claimed is:

1. A process for catalytically dewaxing thereby reducing the pour point of hydrocarbon feeds which process comprises contacting the feed with hydrogen under catalytic dewaxing conditions in the presence of a catalyst composition comprising a crystalline borosilicate molecular sieve and at least one Group VIII noble metal hydrogenation component.

2. The process of claim 1 wherein the hydrogenation component is platinum.

3. The process of claim 1 wherein the hydrogenation component is palladium.

4. The process of claim 1 wherein the catalytic dewaxing conditions include a temperature of about 500° to about 900° F., a pressure of about 100 to about 3,000 psig, LHSV of about 0.1 to about 20.0 reciprocal hours and hydrogen addition rate of about 500 to about 20,000 SCFB.

5. The process of claim 1 wherein the catalytic dewaxing conditions include a temperature of about 500° to about 750° F., a pressure of about 300 to about 900 psig, an LHSV of about 0.20 to about 5.0 reciprocal hours, and hydrogen addition rates of about 2,000 to about 5,000 SCFB.

6. The process of claim 1 wherein the borosilicate molecular sieve comprises an HAMS-1B crystalline borosilicate molecular sieve.

7. The process of claim 1 wherein the borosilicate molecular sieve contains less than about 100 ppm sodium.

8. The process of claim 1 wherein the crystalline borosilicate molecular sieve is prepared by reacting under crystallization conditions, in the substantial absence of a metal or ammonium hydroxide, an aqueous mixture containing an oxide of silicon, and oxide of boron, and ethylenediamine, in a molar ratio to silica of above about 0.05.

9. The process of claim 8 wherein the aqueous mixture further contains an alkylammonium cation or precursor of an alkylammonium cation.

10. The process of claim 1 wherein the crystalline borosilicate molecular sieve is prepared by reacting under crystallization conditions, in the substantial absence of a metal or ammonium hydroxide, an aqueous mixture containg an oxide of silicon, an oxide of boron, and ethylenediamine, in a molar ratio to silica of above about 0.05, wherein the crystalline borosilicate molecular sieve contains at least about 9,000 ppmw boron.

11. The process of claim 10 wherein the aqueous mixture further contains an alkylammonium cation or precursor of an alkylammonium cation.

12. The process of claim 1 wherein the hydrogenation component is present in an amount ranging from 0.01 to about 10 wt%, calculated as a metal based on total catalyst weight.

13. The process of claim 1 wherein the hydrogenation component is present in an amount ranging from about 0.01 to about 5 wt%, calculated as a metal based on total catalyst weight.

14. The process of claim 1 wherein the crystalline borosilicate is dispersed within a non-molecular sieve-containing porous refractory inorganic oxide matrix component.

15. The process of claim 14 wherein the hydrogenating component is deposited on the dispersion of borosilicate and matrix components.

16. The process of claim 14 wherein the hydrogenating component is deposited on the matrix component of the borosilicate-matrix dispersion.

17. The process of claim 14 wherein the matrix component comprises alumina.

18. A process for catalytic dewaxing thereby reducing the pour point of hydrocarbon feeds having a pour point of at least about 30° F. comprising contacting the feed with hydrogen at about 500° to about 750° F., a pressure of about 300 to about 900 psig, an LHSV ranging from about 0.20 to about 5.0 reciprocal hours and a hydrogen addition rate of about 2,000 to about 5,000 SCFB in the presence of a catalyst comprising a hydrogenation component comprising about 0.4 to 1.0 wt% palladium, calculated as metal based on total catalyst weight and a support component comprising an AMS crystalline borosilicate molecular sieve.

19. A process for catalytically dewaxing, thereby reducing the pour point of hydrocarbon feeds which process comprises contacting the feed with hydrogen under catalytic dewaxing conditions in the presence of a catalyst composition comprising an AMS crystalline borosilicate molecular sieve and a hydrogenation component consisting essentially of a Group VIII noble metal.

* * * * *